United States Patent [19]

Ishigami

[11] 3,893,184

[45] July 1, 1975

[54] TAPE CARTRIDGE EJECTION MECHANISM

[75] Inventor: Toshio Ishigami, Tokyo, Japan

[73] Assignee: Pioneer Electronic Corporation, Tokyo, Japan

[22] Filed: Mar. 28, 1973

[21] Appl. No.: 345,820

[30] Foreign Application Priority Data

May 25, 1972 Japan ............................... 47-60548

[52] U.S. Cl. ................................... 360/93; 242/197

[51] Int. Cl. ........................................... G11b 23/04

[58] Field of Search ...................... 360/93, 137, 105; 242/55.19 A, 197

[56] References Cited

UNITED STATES PATENTS

| | | | |
|---|---|---|---|
| 3,188,091 | 6/1965 | Goodell | 360/93 |
| 3,485,500 | 12/1969 | Loeschner | 360/137 |
| 3,492,005 | 1/1970 | Veno et al. | 360/93 |
| 3,599,985 | 8/1971 | Huber | 360/93 |
| 3,617,065 | 11/1971 | Camras | 360/93 |
| 3,633,922 | 1/1972 | Yokota | 360/93 |
| 3,805,289 | 4/1974 | Guyton et al. | 360/93 |

*Primary Examiner*—Alfred H. Eddleman
*Attorney, Agent, or Firm*—Sughrue, Rothwell, Mion, Zinn & Macpeak

[57] ABSTRACT

A tape cartridge eject lever has one end loosely received in a hole within the chassis located adjacent the leading end of the inserted cartridge, the lever extending across the leading end of the cartridge and in contact with the edge adjacent the chassis hole. Force applied to the opposite end of the ejection lever assures ejection of the cartridge and release of the frictional restraint normally holding the cartridge in inserted position.

4 Claims, 4 Drawing Figures

TAPE CARTRIDGE EJECTION MECHANISM

BACKGROUND OF THE INVENTION

1. Field of the Invention

This invention relates to a tape cartridge ejection mechanism and more particularly an ejection mechanism having force amplification to insure release of the cartridge from the tape recorder.

2. Description of the Prior Art

Heretofore, in order to eject the cartridge from a tape recorder, it was necessary to provide a complicated link mechanism to transmit a force from a solenoid plunger or from a manually operated push button to insure releasing of a pawl which normally fits within a notch within the side surface of the cartridge in order to apply pressure to the front surface or leading end of the cartridge, such link mechanism normally requiring a large space for mounting the same.

However, in order to miniaturize tape recorders, it is necessary to rely upon a simple mechanism for ejecting the cartridge, instead of using the conventional complicated link mechanism which requires both a relatively large space to house the same and which is liable to be a source of mechanical failure.

The object of the present invention is to provide a mechanism which is adapted to eject the cartridge both simply and surely.

DESCRIPTION OF THE PREFERRED EMBODIMENT

Figure 1:
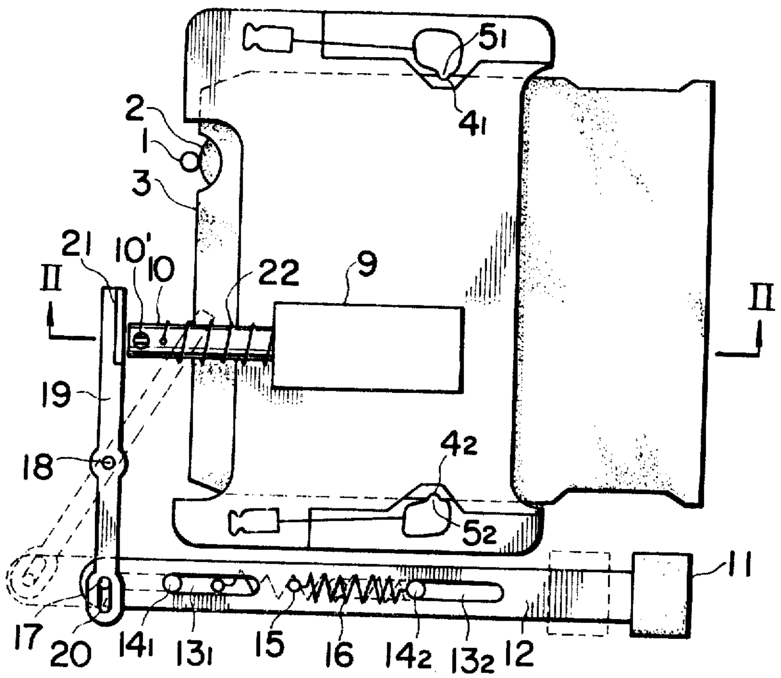
FIG. 1 is a top plan view of a portion of a tape recorder illustrating the tape cartridge ejection mechanism of the present invention.

The construction of one example of the present invention will now be described with reference to the drawings. In FIG. 1, a cartridge 3 is illustrated in the fully inserted position within a compartment formed by spaced parallel plates of a chassis 6 and in a recording or reproducing state, wherein the pinch roller 2 is pressed against the capstan 1 and is locked in that position by means of pawls $5_1$ and $5_2$ which are engaged with notches $4_1$ and $4_2$ on respective side surfaces of the inserted cartridge 3. As seen in the sectional view of FIG. 2, the lower end of a bar shaped ejection lever 8 is insertably received within one plate of a hole 7 within chassis 6, the hole acting as a fulcrum for the bar shaped ejection lever 8. In this respect, the bar shaped ejection lever 8 includes a central portion of enlarged diameter and reduced diameter ends one of which is received within the hole 7. The lower side surface of the ejection lever 8 is in contact with the lower front edge of the inserted cartridge 3. The upper end of the ejection lever 8 is insertably received within a hole 10′ within the movable plunger 10 of solenoid 9, hole 10′ extending through the outer end of the plunger 10, the plunger being biased in an extended position by a concentrically positioned coil spring 22. A small coil spring 8′ surrounds the reduced diameter portion of the ejection lever 8 and acts on the large diameter portion to maintain the bottom end of the ejection lever within hole 7.

To effect manual operation of the ejection lever 8, an operating bar 12 is slidably mounted on chassis 6 by means of guide pins $14_1$ and $14_2$ which project upwardly and within a pair of elongated slots $13_1$ and $13_2$, the bar 12 being provided with a push button 11 at one end thereof. The bar 12 is biased to the right in the drawing by means of a spring 16, one end of which is coupled to one of the fixed pins, as at $14_2$ and the other end of which is coupled to a pin 15 carried by the bar 12. The left hand ends of the elongated holes $13_1$ and $13_2$ are illustrated in FIG. 1 as abutting the guide pins $14_1$ and $14_2$. A pin 17 is fixed to the other end of bar 12 from push button 11 and is received within an elongated hole 20 at one end of a manual pivot lever 19 which is mounted for pivoting intermediate of its ends on shaft 18 which acts as its fulcrum. The lever 19 extends from the side of the cartridge along which the bar 12 lies to a position overlying the outer end of plunger 10 with portion 21 of the lever in a position such that by manual shifting of push button 11 and bar 12 from the full line position to the dotted line position, rotation of pivot lever 19 in a clockwise direction as viewed in FIG. 1, effects retraction of plunger 10 within solenoid 9 against the bias of coil spring 22 to effect pivoting of eject lever 8 in the same manner as that achieved by energization by solenoid 9 (by means not shown) which operation is effected electrically.

Figure 2:
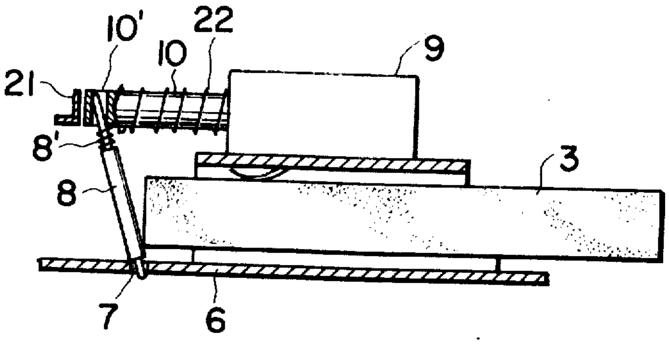
FIG. 2 is a sectional, elevation of the mechanism illustrated in FIG. 1, taken about lines II—II.
Figure 3:
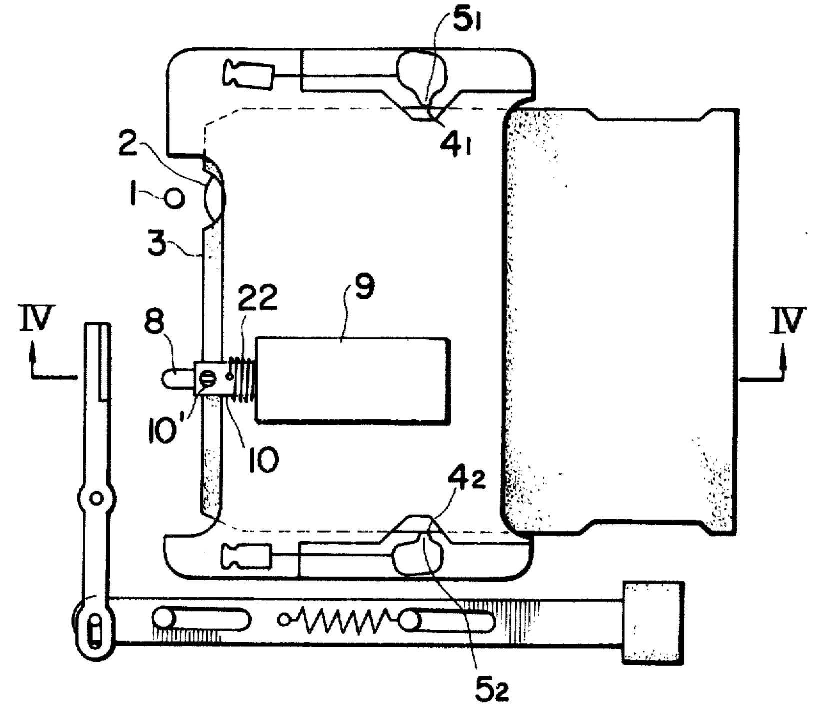
FIG. 3 is a top plan view of the mechanism illustrated in FIG. 1, where the ejection lever is moved to eject position by a solenoid plunger.
Figure 4:
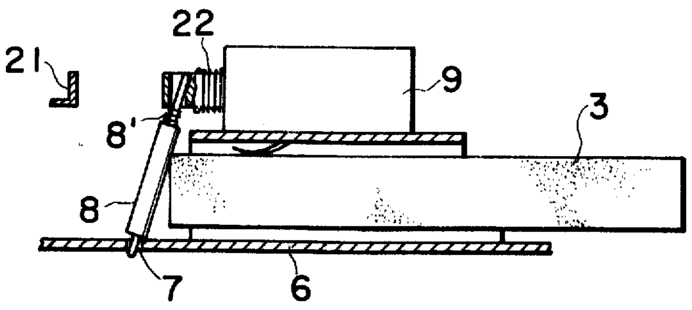
FIG. 4 is a sectional elevation of the mechanism in FIG. 3 taken about lines IV—IV.

This operation is fully described by reference to the drawings. In FIGS. 1 and 2, the plunger 10 is operated by closing of the solenoid circuit (not shown) after detection of termination of either recording or reproduction and by energization of the solenoid, the plunger 10 is moved to the right against the bias of its coil 22 by magnetic attraction. Upon right hand movement of the plunger 10, the lower front edge of the cartridge is first pushed by the lower side surface of ejection lever 8 and since the distance from the fulcrum of lever 8 as defined by holes 7 to the force applied (that is, the lower front edge of the cartridge 3) is extremely short as compared with the distance from the fulcrum of the lever 8 to the force applying point which is the hole 10′ within plunger 10, thus, the moment of the force acting on the cartridge is so great initially that the cartridge may be retracted easily against the pressure exerted on the cartridge on each side surface by pawls $5_1$ and $5_2$ which engage notches $4_1$ and $4_2$ respectively. Although the moment of the force due to movement of the lever from an inclined position to a position generally parallel to the end face of the inserted cartridge 3 decreases by the shift of the force application point on cartridge 3 from the lower edge towards the upper edge as the ejection lever 8 tilts in the opposite direction, by this time pawls $5_1$ and $5_2$ have been released from notches $4_1$ and $4_2$ so that further retraction of the cartridge is effected smoothly following the penetration of the movable plunger 10 within solenoid 9 together with the assistance in the increase in the attractive force of plunger 10 as the plunger continues to move into the solenoid 9, and the pinch roller 2 separates from the capstan 1 and the cartridge 3 is in the state of being fully ejected as illustrated in FIGS. 3 and 4.

Alternatively, in order to eject the cartridge without relying upon the operation of solenoid 9, such ejection may be effected by pushing inwardly on push button 11, FIG. 1, against the force of spring 16. The bar 12 moves from right to left as illustrated in the broken lines in the drawing, lever 19 which is connected to bar 12 via pin 17 and the elongated hole 20 rotates in the clockwise direction with shaft 18 acting as the fulcrum and the movable plunger 10 is forced to the right in the drawing compressing spring 22 by the abutting end portion 21 of lever 19 acting on the end of plunger 10. Thus, the upper portion of ejection lever 8 is moved in the identical manner as would occur by energization of solenoid 9 and magnetic retraction of plunger 10 within the solenoid. In each case, the cartridge 3 is discharged in an efficient and simple manner.

As described above, the discharge of the cartridge is effected easily by disengaging the pawls engaged with notches by efficiently utilizing the pushing force achieved by either the solenoid plunger or the push button with an extremely simple lever mechanism utilizing efficiently the fact that the initial force acts on the cartridge through a short distance from the fulcrum of the lever to the force applied point, as compared with the distance between the fulcrum and the force applying point. Thus, the size of the solenoid and its plunger can be miniaturized and the number of parts of the ejection mechanism may be reduced, leading not only to a reduction in cost, but the possibility of failure due to the mechanism is lessened because of its simplicity and the space required for mounting the mechanism is also small, thus the mechanism according to the present invention is highly effective for miniaturized tape recorders.

What is claimed is:

1. A tape cartridge discharge mechanism for a tape recorder including a chassis, having a compartment formed by spaced parallel plates for slidably receiving an inserted cartridge and having frictional restraints for frictionally latching the cartridge in fully inserted position, said mechanism comprising:

means forming a hole within one of said chassis plates adjacent the leading end of the inserted cartridge, an ejection lever having one end positioned within said hole and extending obliquely away from and lying across the leading end of said cartridge with said one end in contact with said cartridge only at the leading edge adjacent said plate hole, and forming a lever pivot point at said plate hole, and means for exerting an ejection force to the other end of said lever in a direction opposite that of cartridge insertion, whereby; said cartridge is forcibly ejected by force amplification from said recorder by initial contact between the ejection lever and the leading edge of said cartridge adjacent said chassis plate hole.

2. The cartridge ejection mechanism as claimed in claim 1, wherein a solenoid is mounted on said chassis such that its plunger projects away from the leading end of said inserted cartridge and beyond the end of the same, and means are provided for operatively coupling said other end of said ejection lever to said plunger at a point beyond said chassis hole in a direction away from said cartridge, said chassis hole being located with respect to said cartridge, such that the side surface of said ejection lever adjacent the end inserted within said chassis hole contacts only the leading edge of said cartridge adjacent said hole during initial ejection to insure maximum force application in the eject direction upon energization of said solenoid.

3. The cartridge ejection mechanism as claimed in claim 1, further comprising: an operating bar mounted on said chassis for limited movement in a direction parallel to the direction of insertion of said cartridge and adjacent one side thereof, and a pivot lever pivotably mounted intermediate said ejection lever and said bar having one end operatively coupled to said bar and the other end overlying the other end of said ejection lever, whereby longitudinally shifting of said bar causes said pivot lever to apply an ejection force to the other end of said ejection lever and to effect maximum ejection force application to the leading edge of said inserted cartridge adjacent said chassis hole.

4. The cartridge ejection mechanism as claimed in claim 2, further comprising: an operating bar mounted on said chassis for limited movement in a direction parallel to the direction of insertion of said cartridge and adjacent one side thereof, and a pivot lever pivotably mounted intermediate said ejection lever and said bar having one end operatively coupled to said bar and the other end overlying the other end of said ejection lever, whereby longitudinally shifting of said bar causes said pivot lever to apply an ejection force to the other end of said ejection lever and to effect maximum ejection force application to the leading edge of said inserted cartridge adjacent said chassis hole.

* * * * *